(12) United States Patent
Bennett

(10) Patent No.: US 8,276,285 B1
(45) Date of Patent: Oct. 2, 2012

(54) NOTEPAD ACCESSORY FOR HAND TOOLS

(76) Inventor: Bruce A. Bennett, San Rafael, CA (US)

(*) Notice: Subject to any disclaimer, the term of this patent is extended or adjusted under 35 U.S.C. 154(b) by 0 days.

(21) Appl. No.: 13/335,447

(22) Filed: Dec. 22, 2011

(51) Int. Cl.
B43L 7/033 (2006.01)
(52) U.S. Cl. ................... 33/429; 33/480; 33/484
(58) Field of Classification Search ........... 33/429, 33/479, 480, 481, 484
See application file for complete search history.

(56) References Cited

U.S. PATENT DOCUMENTS

| 1,262,971 | A | * | 4/1918 | Olson | 33/429 |
| 2,410,696 | A | * | 11/1946 | Wheeler | 33/484 |
| 4,513,510 | A | | 4/1985 | Swanson | |
| 4,742,619 | A | | 5/1988 | Swanson | |
| 4,766,673 | A | | 8/1988 | Bolson | |
| 4,786,010 | A | | 11/1988 | Dynan | |
| 5,079,851 | A | | 1/1992 | Sill | |
| 5,170,568 | A | | 12/1992 | Wright | |
| 5,459,942 | A | | 10/1995 | Hintz, Jr. | |
| 6,393,710 | B1 | * | 5/2002 | Hastings | 33/484 |
| 6,928,744 | B2 | * | 8/2005 | Schweighoffer et al. | 33/755 |
| 2003/0204963 | A1 | * | 11/2003 | Siefert | 33/429 |
| 2007/0074414 | A1 | * | 4/2007 | Neuroth | 33/429 |
| 2010/0163500 | A1 | | 7/2010 | Megow | |
| 2010/0199509 | A1 | | 8/2010 | Caldi | |
| 2012/0192443 | A1 | * | 8/2012 | Lucero | 33/429 |

FOREIGN PATENT DOCUMENTS

CN 200981432 11/2007

* cited by examiner

Primary Examiner — G. Bradley Bennett
(74) Attorney, Agent, or Firm — Edward S. Wright

(57) ABSTRACT

Notepad accessory for use with a hand tool such as a carpenter's rafter angle square having a generally planar body with an opening between major surfaces on opposite sides of the body. The notepad comprises a pair of generally planar members of greater lateral extent than the opening, a writing surface on one side of each of the generally planar members, and means engagable through the opening for securing the two members together on opposite sides of the body with the writing surfaces facing away from the tool.

17 Claims, 1 Drawing Sheet

NOTEPAD ACCESSORY FOR HAND TOOLS

BACKGROUND OF THE INVENTION

1. Field of Invention

This invention pertains generally to hand tools such as carpenter's squares and, more particularly, to accessories which can be attached to such tools to provide writing surfaces on which notes can made by persons using the tools.

2. Related Art

Carpenters and other people using squares and other hand tools may need to make notes of dimensions and other information while they are working, and although they may have pencils for laying out their work, they generally do not carry tablets or pads on which they can make such notes.

Heretofore, there have been some attempts to provide notepads or writing surfaces for tape measures. Examples of such devices are found in U.S. Pat. Nos. 4,766,673, 4,786,010, 5,079,851, and 5,459,942, and in Published U.S. Patent Applications Nos. 2010/0163500 and 2010/0199509.

Another tool commonly used by carpenters is a rafter angle square as marketed, for example, by the Swanson Tool Company, Inc. under the Speed® and Speed Square® trademarks. Such squares are generally triangular in shape and are used for drawing lines on lumber to be cut and for laying out angles for roofs, stairways, and the like. Examples of such squares are found in U.S. Pat. Nos. 4,513,510, 4,742,619, and 5,170,568. Carpenters using such squares and wishing to make notes currently have to find a block of wood or some other material on which to make them.

OBJECTS AND SUMMARY OF THE INVENTION

It is, in general, an object of the invention to provide a new and improved notepad accessory for hand tools.

Another object of the invention is to provide a notepad accessory of the above character which is particularly suitable for use with a carpenter's square.

These and other objects are achieved in accordance with the invention by providing a notepad accessory for use with a hand tool, such as a rafter angle square, having a generally planar body with an opening between major surfaces on opposite sides of the body. The notepad comprises a pair of generally planar members of greater lateral extent than the opening, a writing surface on one side of each of the generally planar members, and means engagable through the opening for securing the two members together on opposite sides of the body with the writing surfaces facing away from the tool.

DETAILED DESCRIPTION

Figure 1:
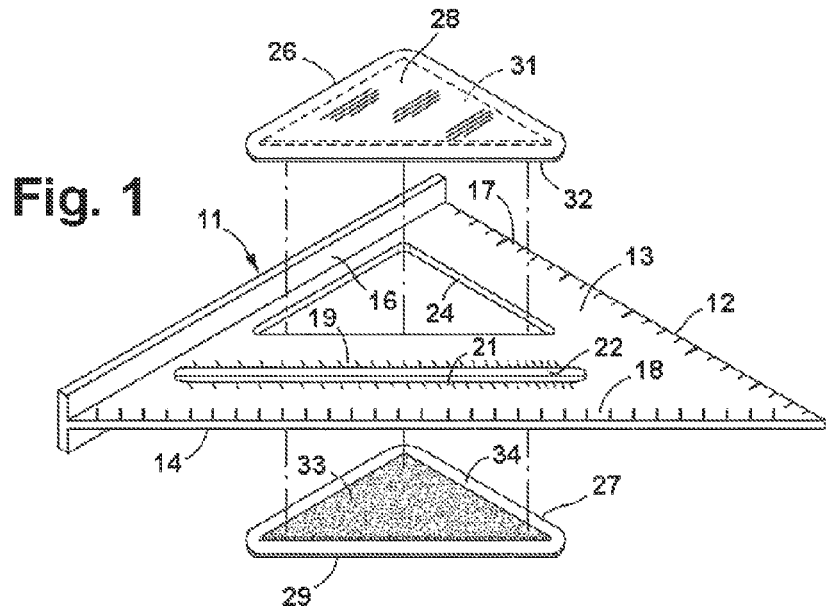
FIG. 1 is an exploded isometric view of one embodiment of a carpenter's square with a notepad accessory in accordance with the invention.

In the drawings, the notepad accessory is illustrated in conjunction with a carpenter's square 11 of the type used for drawing lines on lumber to be cut and for laying out angles for roofs, stairways, and the like. This square has a generally planar, triangular body 12 with major surfaces 13, 14 on opposite sides thereof. A flange or fence 16 extends along one edge of the body, and dimension markings 17 (e.g., inches) extend along another. Degree markings 18 extend along the hypotenuse, and markings 19, 21 for laying out hip and valley rafters extend along the edges of a slot 22 which extends in a direction parallel to the hypotenuse. The square also has a relatively large, triangular opening 24 near the apex of the body, with edges of the opening parallel to the outer edges of the body, for use in laying out birdsmouth cuts and the like.

The notepad includes two generally triangular planar members, or plates, 26, 27 of somewhat greater lateral extent than the opening in the square, with writing surfaces 28, 29 on the outer faces of the plates. In one presently preferred embodiment, the plates are fabricated of a substantially rigid material such as polyvinyl chloride (PVC) with surfaces upon which marks can be made with a pencil and wiped away with a finger. The plates, however, can be made of other suitable materials, if desired.

Means is provided for securing the two plates together in registration with each other on opposite sides of the square, with the writing surfaces facing outwardly, away from the square. In the embodiment illustrated, this means comprises a Velcro® hook and loop fastener which includes a first pad 31 affixed to the inner face 32 of plate 26 and a second pad 33 affixed to the inner face 34 of plate 27, with one of the pads being the loop or female part of the fastener and the other being the hook or male part. The pads are triangular in shape and of lesser lateral extent than the opening in the square, and the thickness of the pads is such that the inner faces of the plates bear tightly against the surfaces of the square when the two pads are pressed together in interlocking relationship through the opening. Although the Velcro® type fastener is preferred, other types of fasteners, such as adhesive pads or magnets, can be utilized for holding the plates together, if desired.

In use, the two plates are positioned in registration with each other on opposite sides of the square, with Velcro® pads 31, 33 facing each other and writing surfaces 26, 27 facing away from the square. The Velcro® pads extend through the opening in the square, with the hooks and loops engaging each other to secure the two plates together with the portions of inner faces 32, 34 between the pads and the edges of the plates abutting against the surfaces 13, 14 of the square around the opening.

With the notepad on the square, the carpenter can hold the square with one hand and make notes with his pencil on one or both of the writing surfaces, then wipe the notes away with a finger when he no longer needs them. The notepad can be removed from the square simply by pulling the two plates apart to disengage the Velcro® pads from each other, and when the notepad is not mounted on the square, the two plates can be secured together with the Velcro® pads and carried in a pocket or in the carpenter's tool bags.

Figure 2:
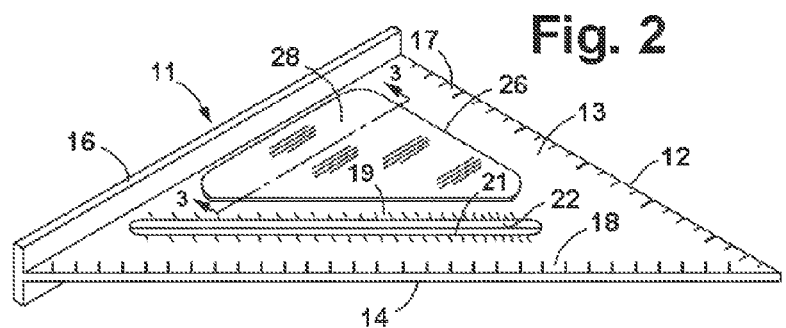
FIG. 2 is an isometric view of the embodiment of FIG. 1 in an assembled state.
Figure 3:
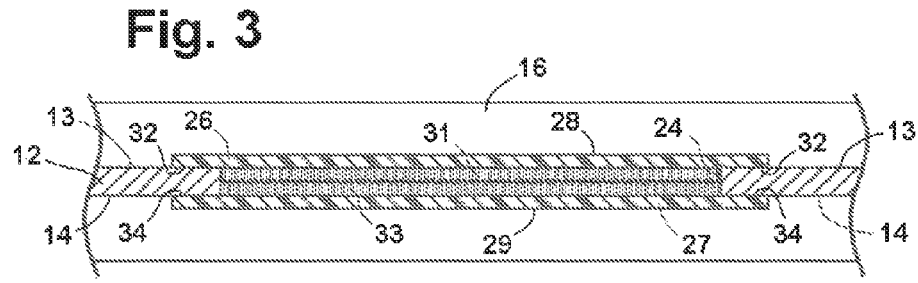
FIG. 3 is a cross-sectional view taken along line 3-3 in FIG. 2.
Figure 4:
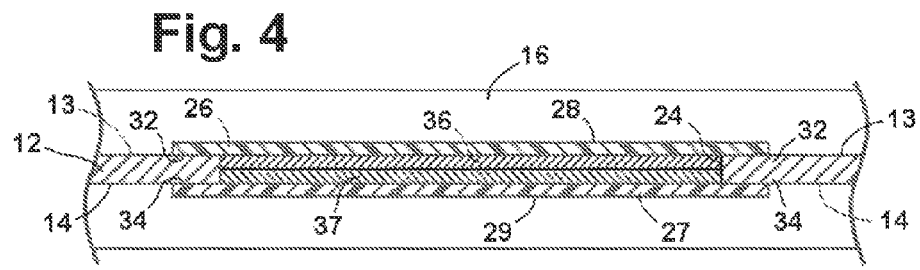
FIG. 4 is a cross-sectional view similar to FIG. 3 of another embodiment of the invention.

The embodiment of FIG. 4 is similar to the embodiment of FIGS. 1-3 except it has magnets 36, 37 in place of Velcro® pads 31, 33. The magnets are triangular in shape and affixed to the inner faces 32, 34 of plates 26, 27. Like the pads, the magnets are of lesser lateral extent than the opening in the square, and the thickness of the magnets is such that the inner faces of the plates are clamped tightly against the surfaces of the square when the magnets draw them together through the opening.

The invention has a number of important features and advantages. It provides a convenient note writing surface for a person using a tool such as a carpenter's square, and it is readily installed upon and removed from the tool, as needed.

It is apparent from the foregoing that a new and improved notepad accessory for hand tools has been provided. While only certain presently preferred embodiments have been described in detail, as will be apparent to those familiar with the art, certain changes and modifications can be made without departing from the scope of the invention as defined by the following claims.

The invention claimed is:

1. A notepad accessory for a hand tool having a generally planar body with an opening between major surfaces on opposite sides of the body, comprising: a pair of generally planar members of greater lateral extent than the opening, a writing surface on one side of each of the generally planar members, and means engagable through the opening for securing the two members together on opposite sides of the body with the writing surfaces facing away from the tool.

2. The notepad accessory of claim 1 wherein the writing surface is such that marks can be made upon it with a pencil and wiped away with a finger.

3. The notepad accessory of claim 1 wherein the planar members are fabricated of polyvinyl chloride (PVC).

4. The notepad accessory of claim 1 wherein the means for securing the two planar members together comprises a hook and loop fastener having a hook portion affixed to one of the generally planar members and a loop portion affixed to the other generally planar member.

5. The notepad accessory of claim 1 wherein the means for securing the two planar members together comprises a pair of magnets affixed to respective ones of the generally planar members.

6. A notepad accessory for use with a hand tool, comprising a pair of generally triangular superposed plates of rigid material each having a writing surface on one side thereof, and generally triangular pads of hook and loop fastener material of lesser lateral extent than the plates attached to surfaces of the plates opposite the writing surfaces for securing the plates together on the tool with the writing surfaces facing away from each other.

7. The notepad accessory of claim 6 wherein the generally triangular plates and pads have rounded corners.

8. The notepad accessory of claim 6 wherein the writing surfaces are such that marks can be made upon them with a pencil and wiped away with a finger.

9. The notepad accessory of claim 6 wherein the plates are fabricated of polyvinyl chloride (PVC).

10. A carpenter's square having a generally planar body with markings along edge portions thereof and an opening between major surfaces on opposite sides of the body, first and second generally planar members of greater lateral extent than the opening disposed in registration with each other on the opposite sides of the body with a writing surface on one of the members facing away from the body, and means extending through the opening for holding the two planar members together against the major surfaces of the body.

11. The carpenter's square of claim 10 wherein the two planar members are held together in a manner permitting the members to be separated from each other and removed from the square.

12. The carpenter's square of claim 10 wherein the means for holding the two planar members together comprises a hook and loop fastener.

13. The carpenter's square of claim 10 wherein the means for holding the two planar members together comprises a pair of magnets.

14. The carpenter's square of claim 10 wherein the writing surface is such that marks can be made upon it with a pencil and wiped away with a finger.

15. The carpenter's square of claim 10 wherein the planar members are fabricated of polyvinyl chloride (PVC).

16. The carpenter's square of claim 10 wherein the body of the square and the opening in the body are triangular, and the planar members are triangular plates with rounded corners.

17. The carpenter's square of claim 10 wherein each of the planar members has a writing surface which faces away from the body of the square.

\* \* \* \* \*